United States Patent Office 3,156,980
Patented Nov. 17, 1964

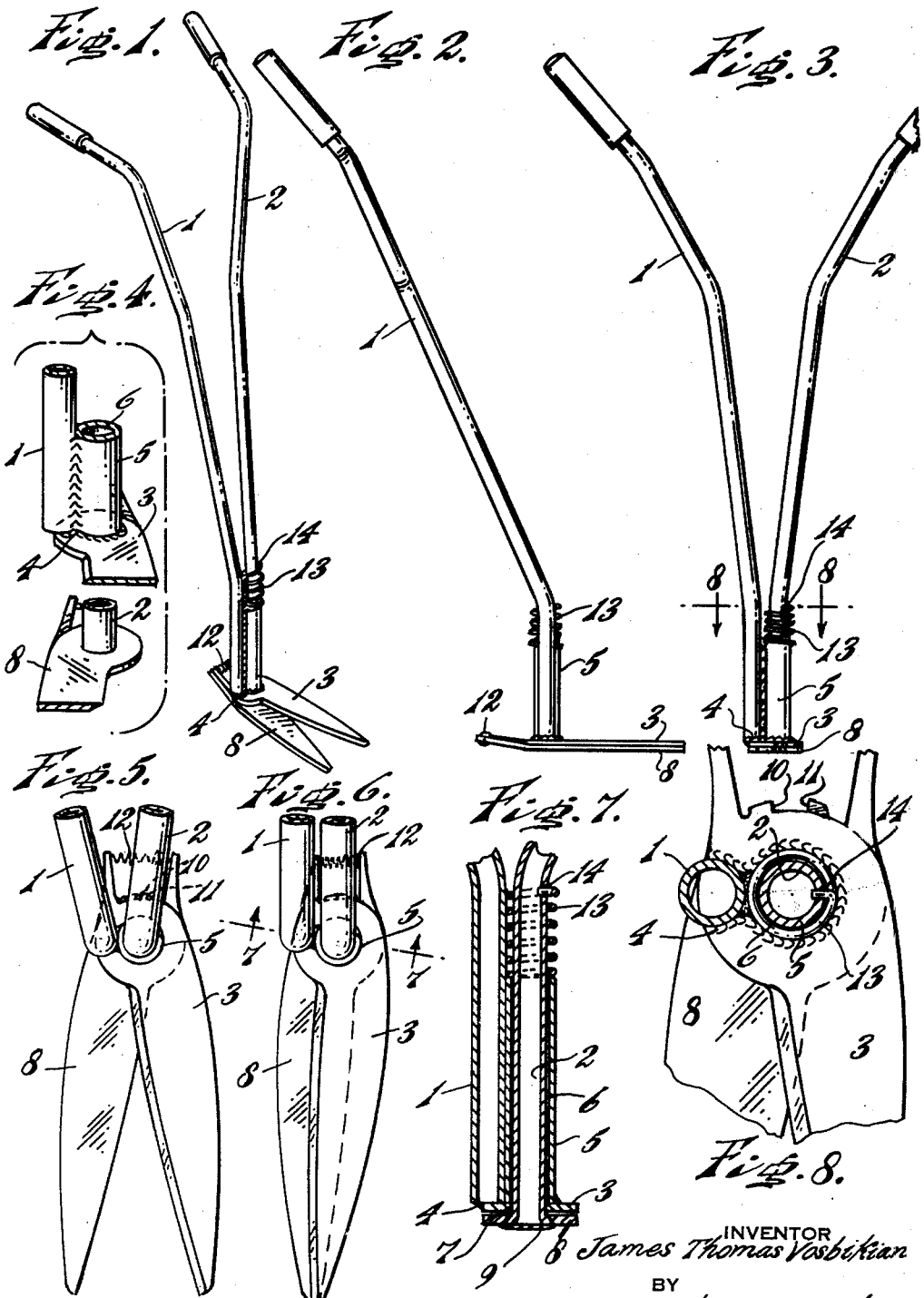

3,156,980
SHEARS FOR CUTTING AND TRIMMING
James T. Vosbikian, 20th and Oxford Sts.,
Philadelphia, Pa.
Filed Dec. 14, 1962, Ser. No. 244,807
1 Claim. (Cl. 30—253)

The purpose of my present invention is to devise a novel and simplified construction of shears which, while primarily designed for grass cutting and trimming, can be used for cutting or trimming any desired material.

A further object of the invention is to have each handle fixed to its respective cutting blade, and wherein one handle, passes through a bore laterally offset from the other handle, through a top blade and is fixedly connected with a bottom blade.

A further object is to provide novel tensioning means for the blades and a construction and arrangement in which the blades are not pivotally connected with each other.

A further object of the invention is to provide novel means tending to move the blades into their open position.

With the foregoing and other objects in view, as will hereinafter clearly appear, my invention comprehends a novel construction and arrangement of shears having actuating handles extending upwardly, and terminating in rearward extensions, so that the shears may be operated by a person standing in an upright position.

It further comprehends novel means for connecting the handles with the blades, and wherein one handle forms a pivotal point for the closing and opening movements of the blades.

It further comprehends a novel construction, wherein one handle has a laterally offset bore through which the other handle extends.

It further comprehends novel tensioning means for the blades, whereby the blades can be separated by lowering one handle to permit the removal of any material lodged or caught between the blades.

For the purpose of illustrating the invention, I have shown in the accompanying drawings preferred embodiments of it, which I have found in practice, to give reliable and satisfactory results. It is, however, to be understood that the various instrumentalities of which the invention consists can be variously arranged and organized, and I therefore, do not desire to be limited, except by the scope of the appended claim, to the exact arrangement and organization of these instrumentalities as herein set forth.

FIGURE 1 is a perspective view of shears for cutting and trimming, embodying our invention.

FIGURE 2 is a side elevation.

FIGURE 3 is a front elevation.

FIGURE 4 is a fragmentary, exploded perspective of the lower part of the shears.

FIGURE 5 is a top plan view of the shears in their open position with the handles broken away.

FIGURE 6 is a top plan view of the shears in their closed position with the handles broken away.

FIGURE 7 is a section taken on the line 7—7 of FIGURE 6.

FIGURE 8 is an enlarged section on the line 8—8 of FIGURE 3.

Similar numerals of reference indicate corresponding parts.

Referring to the drawings:

The shears are provided with a right tubular handle 1, and a left handle 2. The handle 1 is rigidly fixed at its bottom end in a top shear blade 3 and is secured thereto by a weld 4. The handle 1 has also secured to its bottom portion, as by welding, and laterally offset therefrom, an extension 5, provided with a bore 6, adapted to receive the left hand handle 2. The extension 5 is also fixed to the top blade 3 as by welding. The blade 3 is provided with a hole 7 adapted to receive the handle 2, which terminates at its bottom end in a shear blade 8, and is fixedly connected thereto as by a weld 9. The blades 3 and 8 are provided at their rearward ends with extensions 10 and 11, the extension 11 being bent downwardly so as to strike against the opposite extension 10 when the blades are in their closed position and thus forming a stop for the blades. The blades 3 and 8 are also provided at their rearward ends with extensions adapted to receive a spring 12 which acts to retain the blades in their open position. The handle 2 at its lower end is provided with a helical spring 13, fixed to the handle at 14 and bearing against the top of the extension 5 to retain the blades in operating relationship.

The operation is as follows:

The blades are normally held in their open position by a spring interposed between the blades, and mounted on rearward extending arms, or if the spring is dispensed with, by the operator holding the handle in a laterally spread condition.

If the handles are moved towards each other, or if one handle is held in a stationary position and the other handle moved laterally towards it, the cutting operation is effected. The right hand handle is connected to the blade at the opposite side which as shown, is the top blade. The left hand handle passes through a bore in a lateral extension of the right handle and such extension may be integral with the right handle or for economy in manufacture, a separate member may be fixed to the right hand handle. The left hand handle passes through an opening at the rear portion of the top blade and is fixed to the rear portion of the bottom blade.

Thus, the left hand handle and the offset lateral extension form in a sense, a floating fulcrum for the pivotal action of the blades. The upper portion of the handles flare outwardly and terminate in rearward extensions forming grasping portions for the operator.

If the blades are moved along a right hand border, the right hand handle is held stationary and the left hand handle is moved towards the right hand handle to effect the cutting operation. If a left hand border is to be cut, then the left hand handle is held stationary and the right hand handle is moved towards the left handle to effect the cutting operation.

If the left handle is pushed downwardly, while the right handle is held stationary, the bottom blade is moved downwardly out of contact with the top blade so that any material lodged between the blades can be readily removed.

It is to be noted that the component parts are assembled in cooperative relationship without the use of bolts and nuts.

The spring 12 may be omitted, since the handles can be actuated to control the extent of the opening and closing movement of the blades.

It is to be noted that the left handle is not tubular and the right handle has a sleeve extending longitudinally along its lower portion and offset from the longitudinal axis of such portion and the spring is connected at one end to the left handle and bears against the sleeve to maintain the cutting edges of the blades in frictional engagement.

Having thus described my invention, what I claim as new and desire to secure by Letters Patent is:

Shears, comprising a pair of blades forming a right and a left blade, a pair of handles one of which is fixed to the left blade and is provided with a lateral extension having at its lower portion a sleeve laterally offset from its handle and extending longitudinally along it, the other handle passing through said sleeve through the left blade and fixed to the right blade, and a spring between the second handle and said sleeve, maintaining said blades in frictional engagement.

References Cited by the Examiner

UNITED STATES PATENTS

| | | | |
|---|---|---|---|
| 1,072,151 | 9/13 | Norcross | 56—241 X |
| 1,093,726 | 4/14 | Pearson | 30—257 |
| 1,579,052 | 3/26 | Altvater | 30—257 X |
| 1,656,923 | 1/28 | Seme | 30—261 X |
| 1,845,798 | 2/32 | Keiser | 30—261 X |
| 1,943,960 | 1/34 | Heumann | 30—252 X |

WILLIAM FELDMAN, *Primary Examiner.*

MILTON S. MEHR, *Examiner.*